(12) United States Patent
Song et al.

(10) Patent No.: US 12,431,525 B2
(45) Date of Patent: Sep. 30, 2025

(54) APPARATUS AND METHOD FOR MANUFACTURING ELECTRODE ASSEMBLY AND METHOD FOR MANUFACTURING SECONDARY BATTERY COMPRISING THE SAME

(71) Applicant: LG Energy Solution, Ltd., Seoul (KR)

(72) Inventors: Dong Hun Song, Daejeon (KR); Tai Joon Seo, Daejeon (KR); Woo Yong Lee, Daejeon (KR); Chun Ho Kwon, Daejeon (KR); Tai Jin Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 453 days.

(21) Appl. No.: 17/781,534

(22) PCT Filed: Nov. 25, 2020

(86) PCT No.: PCT/KR2020/016846
§ 371 (c)(1),
(2) Date: Jun. 1, 2022

(87) PCT Pub. No.: WO2021/112481
PCT Pub. Date: Jun. 10, 2021

(65) Prior Publication Data
US 2023/0006239 A1  Jan. 5, 2023

(30) Foreign Application Priority Data

Dec. 6, 2019  (KR) .................. 10-2019-0161729
Nov. 18, 2020  (KR) .................. 10-2020-0154997

(51) Int. Cl.
B29C 65/78  (2006.01)
B32B 38/18  (2006.01)
(Continued)

(52) U.S. Cl.
CPC ..... *H01M 10/0404* (2013.01); *B29C 65/7802* (2013.01); *B32B 38/1833* (2013.01);
(Continued)

(58) Field of Classification Search
CPC ............ B29C 65/7802; B29C 65/7861; B32B 37/0046; B32B 37/02; B32B 37/18;
(Continued)

(56) References Cited

U.S. PATENT DOCUMENTS

2014/0026398 A1\* 1/2014 Watanabe ........... H01M 10/052
29/730
2014/0027643 A1  1/2014 Aramaki et al.
(Continued)

FOREIGN PATENT DOCUMENTS

CN  108028413 A  5/2018
CN  108496269 A  9/2018
(Continued)

OTHER PUBLICATIONS

International Search Report for Application No. PCT/KR2020/016846 dated Mar. 12, 2021, 2 pgs.
(Continued)

*Primary Examiner* — Michael A Tolin
(74) *Attorney, Agent, or Firm* — Lerner David LLP

(57) ABSTRACT

The present invention relates to a method for manufacturing an electrode assembly. The method for manufacturing the electrode assembly comprises: a step (a) of transferring a plurality of radical units one by one from a first set position to a second position; a step (b) of measuring a distance between a full width end that is an end of the first electrode in a full width direction and a full width end that is an end of the second electrode in a full width direction; a step (c) of measuring a distance (B1) from a reference point (O) of the second set position to the full width end of the first
(Continued)

electrode of the first radical unit; a step (d) of stacking the second radical unit on the first radical unit; a step (e) of measuring a distance (B2) from the reference point (O) of the second set position to the full width end of the first electrode of the second radical unit; a step (f) of measuring a distance (C1) between the full length end of the first electrode of the first radical unit and the full width end of the second electrode of the second radical unit by adding the distances (B2, A2) to each other and subtracting the distance (B1) from the sum of the distances (B2, A2); and a step (g) of comparing the distances (C1, A1) to each other to determine whether stacking is defective.

14 Claims, 16 Drawing Sheets

(51) Int. Cl.
  *B32B 41/00* (2006.01)
  *H01M 10/04* (2006.01)
  *H01M 10/0585* (2010.01)
  *G01B 11/02* (2006.01)
  *G06T 7/00* (2017.01)
  *G06T 7/13* (2017.01)

(52) U.S. Cl.
  CPC ..... *H01M 10/0585* (2013.01); *B32B 2041/04* (2013.01); *B32B 2309/72* (2013.01); *B32B 2457/10* (2013.01); *G01B 11/028* (2013.01); *G06T 7/0004* (2013.01); *G06T 7/13* (2017.01)

(58) Field of Classification Search
  CPC . B32B 38/18; B32B 38/1825; B32B 38/1833; B32B 38/1841; B32B 39/00; B32B 41/00; B32B 41/04; B32B 2309/70; B32B 2309/72; B32B 2457/10; G01B 11/028; G01B 11/14; G06T 7/0002; G06T 7/0004; G06T 7/13; H01M 10/04; H01M 10/0404; H01M 10/0413; H01M 10/0436; H01M 10/058; H01M 10/0585; Y02E 60/10; Y02P 70/50
  See application file for complete search history.

(56) References Cited

U.S. PATENT DOCUMENTS

| | | |
|---|---|---|
| 2016/0149254 A1 | 5/2016 | Ban et al. |
| 2018/0212277 A1 | 7/2018 | Park et al. |
| 2019/0027789 A1 | 1/2019 | Kim et al. |
| 2019/0341658 A1 | 11/2019 | Han et al. |
| 2020/0067051 A1 | 2/2020 | Yamashita et al. |
| 2020/0091544 A1 | 3/2020 | Jeong et al. |
| 2020/0152944 A1 | 5/2020 | Sumita et al. |
| 2020/0212494 A1 | 7/2020 | Kim et al. |

FOREIGN PATENT DOCUMENTS

| | | | |
|---|---|---|---|
| CN | 109937502 A | | 6/2019 |
| CN | 110441325 A | | 11/2019 |
| EP | 2696422 A1 | | 2/2014 |
| EP | 3312926 A1 | | 4/2018 |
| JP | 2012227131 A | | 11/2012 |
| JP | 5189758 B2 | | 4/2013 |
| JP | 2014096212 A | | 5/2014 |
| JP | 2016515753 A | | 5/2016 |
| JP | 2019029294 A | | 2/2019 |
| JP | 6589517 B2 | | 10/2019 |
| KR | 101121259 B1 | | 3/2012 |
| KR | 20160132566 A | | 11/2016 |
| KR | 20180075181 A | | 7/2018 |
| KR | 101976174 B1 | | 5/2019 |
| KR | 20190059676 A | | 5/2019 |
| KR | 2019085403 A | * | 7/2019 |
| KR | 20190085403 A | | 7/2019 |
| KR | 20190089507 A | | 7/2019 |
| KR | 20190091746 A | | 8/2019 |
| KR | 20190113022 A | | 10/2019 |
| KR | 20190113907 A | | 10/2019 |
| KR | 20190126524 A | | 11/2019 |
| WO | 2019017074 A1 | | 1/2019 |

OTHER PUBLICATIONS

Extended European Search Report including Written Opinion for Application No. 20897350.3 dated Jul. 1, 2024, pp. 1-5.
Search Report dated Nov. 22, 2024 from the Office Action for Chinese Application No. 202080077418.6 issued Nov. 27, 2024, 2 pages.

* cited by examiner $$\boxed{En + Dn - E2 = En}$$

APPARATUS AND METHOD FOR MANUFACTURING ELECTRODE ASSEMBLY AND METHOD FOR MANUFACTURING SECONDARY BATTERY COMPRISING THE SAME

CROSS-REFERENCE TO RELATED APPLICATION

The present application is a national stage entry under 35 U.S.C. § 371 of International Application No. PCT/KR2020/016846, filed on Nov. 25, 2020, published in Korean, which claims priority to Korean Patent Application Nos. 10-2019-0161729, filed on Dec. 6, 2019, and 10-2020-0154997, filed on Nov. 18, 2020, the entire contents of which are hereby incorporated by reference herein.

TECHNICAL FIELD

The present invention relates an apparatus and method for manufacturing an electrode assembly, which are capable of improving stacking alignment, and a method for manufacturing a secondary battery comprising the electrode assembly.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary battery is classified into a can type secondary battery in which the electrode assembly is embedded in a metal can and a pouch type secondary battery in which the electrode assembly is embedded in a pouch. The electrode assembly is classified into a stacked type structure, a wound type (jelly-roll type) structure, or stacked/folded type structure. The stacked type electrode assembly has a structure in which a plurality of radical units are stacked.

However, the stacked type electrode assembly has a problem in that the plurality of radical units are not uniformly stacked.

DISCLOSURE OF THE INVENTION

Technical Problem

The present invention has been invented to solve the above problems, and the present invention is to provide an apparatus and method for manufacturing an electrode assembly that are capable of improving stacking alignment by measuring a position of a radical unit, and a method for manufacturing a secondary battery comprising the electrode assembly.

Technical Solution

A method for manufacturing an electrode assembly according to the present invention for achieving the above object comprises: a step (a) of transferring a plurality of radical units, in which a first electrode, a separator, a second electrode, and a separator are sequentially stacked, one by one from a first set position to a second position; a step (b) comprising a process of measuring a distance (A), in which the radical units are photographed at the first set position to measure a distance (A1) between a full width end that is an end of the first electrode in a full width direction and a full width end that is an end of the second electrode in a full width direction, which are provided in the photographed first radical unit, a distance (A2) between a full width end that is an end of the first electrode in a full width direction and a full width end that is an end of the second electrode in a full width direction, which are provided in the photographed second radical unit, and a distance (An) between a full width end that is an end of the first electrode in a full width direction and a full width end that is an end of the second electrode in a full width direction, which are provided in the photographed n-th radical unit; a step (c) comprising a process of measuring a distance (B1), in which, when the first radical unit, at which the distance (A1) is measured, is transferred to the second set position, the distance (B1) from a reference point (O) of the second set position to the full width end of the first electrode of the first radical unit is measured; a step (d) of stacking the second radical unit, which is transferred to the second set position via the first set position, on the first radical unit; a step (e) comprising a process of measuring a distance (B2) from the reference point (O) of the second set position to the full width end of the first electrode of the second radical unit; a step (f) comprising a process of measuring a distance (C1) between the full length end of the first electrode of the first radical unit and the full width end of the second electrode of the second radical unit by adding the distances (B2, A2) to each other and subtracting the distance (B1) from the sum of the distances (B2, A2); and a step (g) comprising a full width inspection process, in which the distances (C1, A1) are compared to each other to determine that the stacking is normal when a difference value between the distances (C1, A1) is within an input error value, and the stacking is defective when the difference value is out of the input error value.

The step (b) may further comprise a process of determining that when the distance (A1) measured in the process of measuring the distance (A1) is within an input set value, the stacking is normal, and when the distance (A1) is out of an input set value, the stacking is defective.

The step (b) may further comprise a process of removing the radical unit so as not to be transferred to the second set position when it is determined that the radical unit is defective at the first set position.

In the step (b), a distance between the full width end of the first electrode of the radical unit and the full width end of the second electrode may be measured at the first set position by using a vision alignment tester.

The step (c) may further comprise a process of inspecting whether the reference point (O) of the second set position and a reference point of the first radical unit match with each other, wherein the reference point of the radical unit is a point at which a line equally dividing the radical unit in the full width direction and a line equally dividing the first radical unit in the full length direction cross each other.

The step (c) may further comprise a process in which, when the reference point (O) of the second set position and the reference point of the radical unit mismatch with each other, the radical unit is moved so that the reference point (O) of the second set position and the reference point of the radical unit match with each other.

The step (g) may further comprise a process in which, when it is determined as defective stacking in the full width inspection process, a position of the second radical unit is adjusted by a difference value obtained by comparing the distance (C1) to the distance (A1) of the first radical unit.

In the step (a), the first electrode may have an area less than that of the second electrode.

The step (g) may further comprise a process in which, when it is determined as normal stacking, the first radical unit and the second radical unit are boned to each other.

The method may further comprises: a step (h) of, after the step (g), stacking an n-th radical unit, which is transferred to the second set position via the first set position, on the second radical unit; a step (i) comprising a process of measuring a full width distance (Bn) from the reference point (O) of the second set position to the full width end of the first electrode of the n-th radical unit; a step (j) comprising a process of measuring a distance (Cn) between the full width end of the first electrode of the second radical unit and the full width end of the second electrode of the n-th radical unit by adding the distances (Bn, An) to each other and subtracting the distance (B2) from the sum of the distances (Bn, An); and a step of comparing the distance (Cn) to the distance (A2) of the second radical unit to determine that the stacking is normal when a difference value between the distances (Cn, A2) is within the input error value, and the stacking is defective when the difference value is out of the input error value.

The step (b) may further comprise a process of measuring a distance (D), in which a distance (D1) between a full length end that is an end of the first electrode in a full length direction and a full length end that is an end of the second electrode in a full length direction, which are provided in the photographed first radical unit, a distance (D2) between a full length end that is an end of the first electrode in a full length direction and a full length end that is an end of the second electrode in a full length direction, which are provided in the photographed second radical unit, and a distance (Dn) between a full length end that is an end of the first electrode in a full length direction and a full length end that is an end of the second electrode in a full length direction, which are provided in the photographed n-th radical unit, the step (c) may further comprise a process of measuring, when the first radical unit is transferred to the second set position, a distance (E1) from the reference point (O) of the second set position to the full length end of the first electrode of the first radical unit, the step (e) further comprises a process of measuring a distance (E2) from the reference point (O) of the second set position to the full length end of the first electrode of the second radical unit, the step (f) may further comprise a process of measuring a distance (F1) between the full length end of the first electrode of the first radical unit and the full length end of the second electrode of the second radical unit by adding the distances (E2, D2) of the second radical units to each other and subtracting the distance (E1) from the sum of the distances (E2, D2), and the step (g) may further comprise a full width inspection process, in which the distance (F1) and the distance (D1) of the first radical unit are compared to each other to determine that the stacking is normal when a difference value between the distances (F1, D1) is within an input error value, and the stacking is defective when the difference value is out of the input error value.

The step (g) may further comprise a process in which, when it is determined as defective stacking in the full length inspection process, a position of the second radical unit is adjusted by a difference value obtained by comparing the distance (F1) and the distance (D1) of the first radical unit.

The step (i) may further comprise a process of measuring a distance (En) from the reference point (O) of the second set position to the full length end of the first electrode of the n-th radical unit, the step (j) may further comprise a process of measuring a distance (Fn) between the full length end of the first electrode of the second radical unit and the full length end of the second electrode of the n-th radical unit by adding the distances (En, Dn) of the n-th radical unit to each other and subtracting the distance (D2) from the sum of the distances (En, Dn), and the step (k) may further comprise a process of comparing the distance (Fn) to the distance (D2) of the second radical unit to determine that the stacking is normal when a difference value between the distances (Fn, D2) is within the input error value, and the stacking is defective when the difference value is out of the input error value, and the stacking is defective when the difference value is out of the input error value.

A method for manufacturing a secondary battery according to the present invention comprises: a step (A) of manufacturing an electrode assembly according to claim 1; and a step (B) of accommodating the electrode assembly in a battery case and injecting an electrolyte into the battery case to manufacture the secondary battery.

An apparatus for manufacturing an electrode assembly according to the present invention comprises: a loading box in which a plurality of radical units, in which a first electrode, a separator, a second electrode, and a separator are sequentially stacked, are vertically loaded; a transfer member configured to transfer the radical unit loaded at the uppermost end among the radical units loaded in the loading box to a first set position (H1) and transfer the radical unit disposed at the first set position (H1) again to a second set position (H2); a first measuring member configured to measure a distance from an end of the first electrode to an end of the second electrode, which are provided in the radical unit which is transferred at the first time and disposed at the first set position (H1), and a distance from an end of the first electrode to an end of the second electrode, which are provided in the radical unit transferred at the second time; and a second measuring member configured to measure the radical unit that is transferred at the first time to the second set position (H2), wherein a distance (B1) from a reference point (O) of the second set position (H2) to the end of the first electrode of the radical unit that is transferred at the first time is measured, a distance (B2) from the reference point (O) of the second set position (H2) to an end of the first electrode of the radical unit that is transferred at the second time and stacked on the radical unit that is transferred at the first time is measured, a distance (C1) between an end of the first electrode of the radical unit that is transferred at the first time and an end of the second electrode of the radical unit that is transferred at the second time by adding the distances (B2, A2) of the radical unit that is transferred at the second time to each other and subtracting the distance (B1) of the radical unit that is transferred at the first time from the sum of the distances (B2, A2) is measured, and the distance (C1) and the distance (A1) of the radical unit that is transferred at the first time are compared to each other to determine that the stacking is normal when a difference value between the distances (C1, A1) is within an input error value, and the stacking is defective when the difference value is out of the input error value.

Advantageous Effects

In the method for manufacturing the electrode assembly according to the present invention, it is possible to confirm the stacking failure of the radical units to be stacked together. Particularly, when the stacking failure occurs, the position of the radical unit may be changed by the error value to improve the stacking alignment.

BRIEF DESCRIPTION OF THE DRAWINGS

FIG. 5 is a plan view of FIG. 4a.

FIG. 7 is a plan view of FIG. 6a.

MODE FOR CARRYING OUT THE INVENTION

Figure 1:
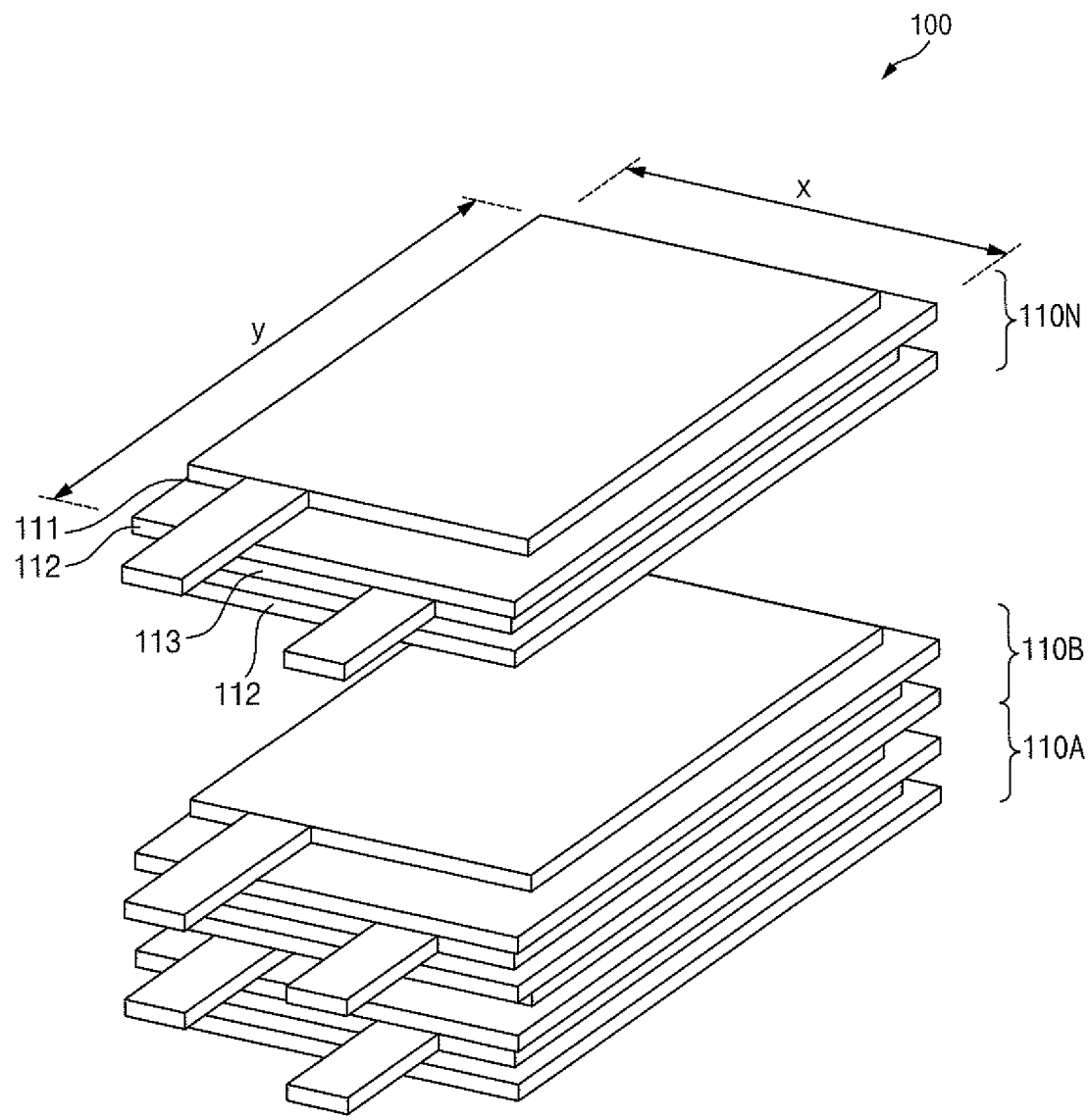
FIG. 1 is a side view of an electrode assembly according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Assembly According to First Embodiment of the Present Invention]

As illustrated in FIG. 1, an electrode assembly 100 according to a first embodiment of the present invention has a structure in which radical units 110, in which the same number of electrodes and separators are alternately disposed to be integrally bonded to each other, are repeatedly disposed.

For example, the electrode assembly 100 according to the first embodiment of the present invention comprises a plurality of radical units 110, which are vertically stacked. Each of the radical units 110 has a four-layered structure in which a first electrode 111, a separator 112, a second electrode 113, and a separator 112 are sequentially stacked.

Here, the first and second electrodes 111 and 113 may have polarities opposite to each other. For example, if the first electrode 111 is a positive electrode, the second electrode 113 is a negative electrode. Also, the first electrode 111 has an area less than that of the second electrode 113.

The electrode assembly 100 having the above-described stacked structure according to the first embodiment of the present invention is manufactured using an apparatus for manufacturing the electrode assembly 100.

[Apparatus for Manufacturing Electrode Assembly According to First Embodiment of the Present Invention]

Figure 2:
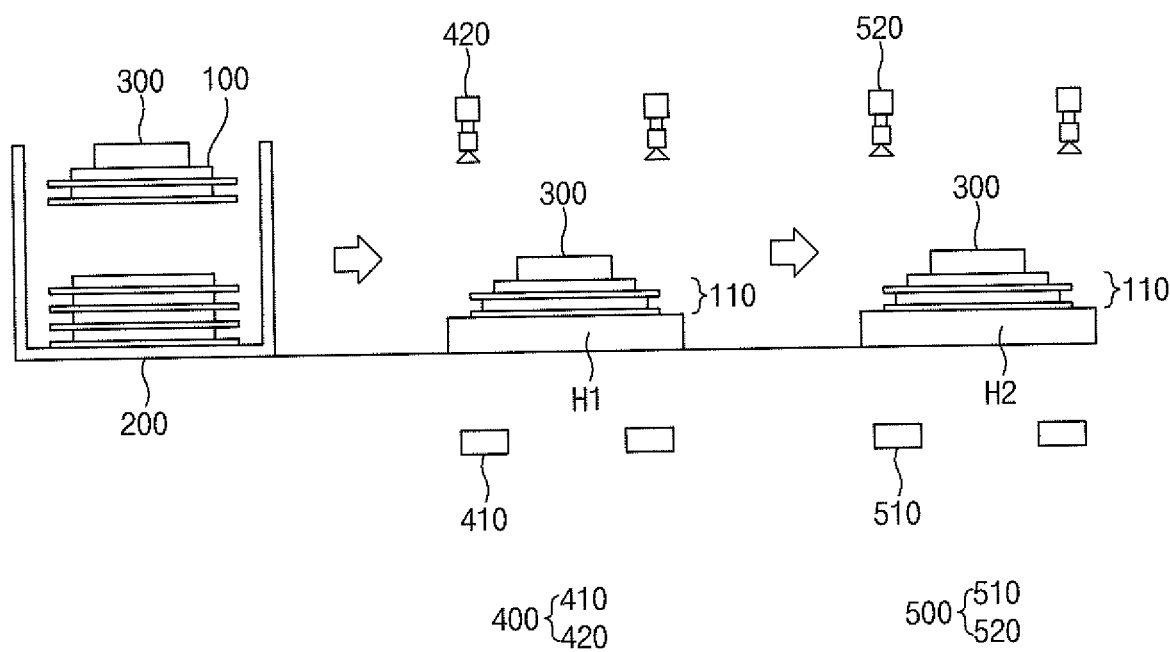
FIG. 2 is a view illustrating an apparatus for manufacturing the electrode assembly according to the first embodiment of the present invention.
Figure 3:
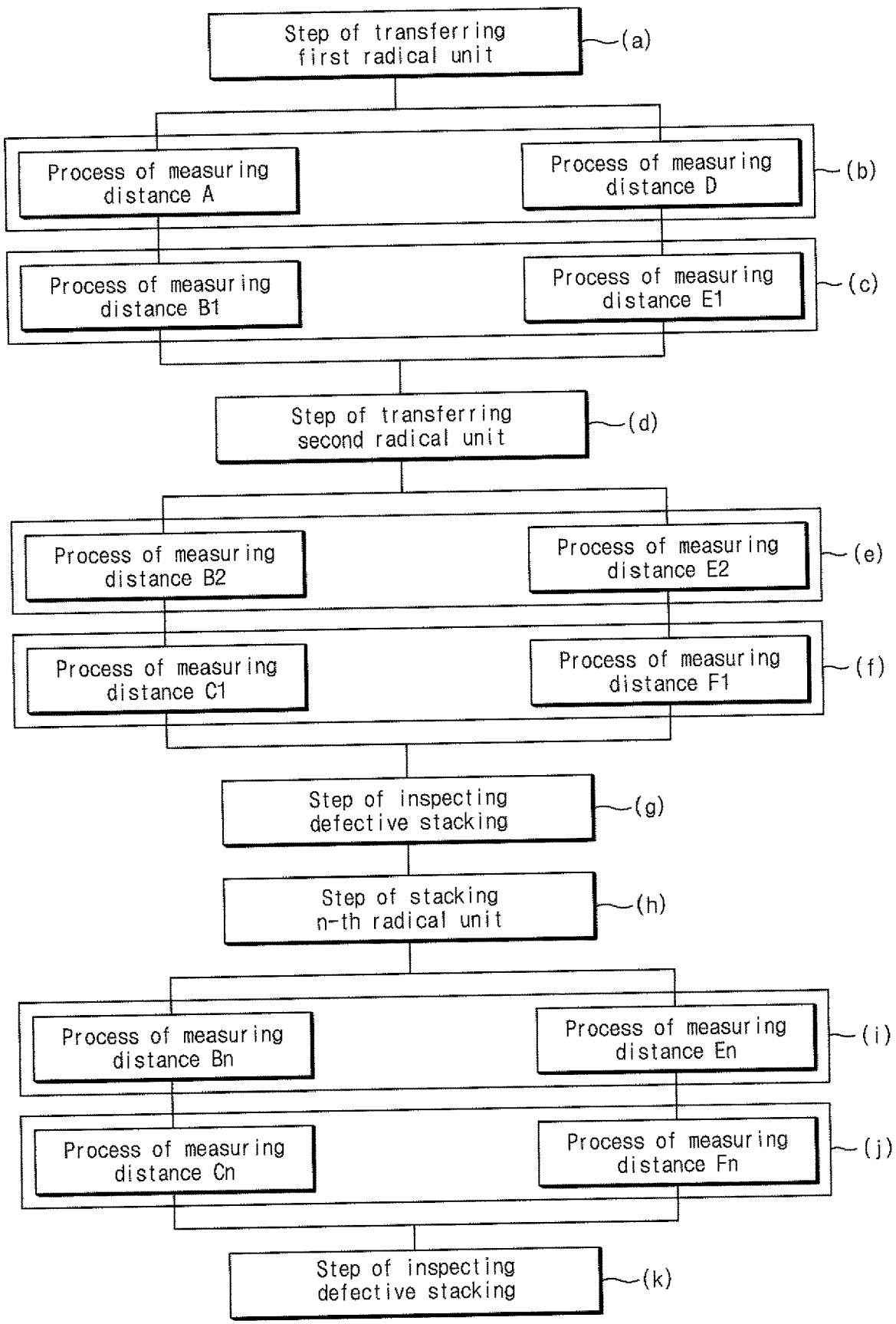
FIG. 3 is a flowchart illustrating a method for manufacturing the electrode assembly according to the first embodiment of the present invention.

As illustrated in FIG. 2, an apparatus for manufacturing the electrode assembly according to the first embodiment of the present invention stacks a plurality of radical units in a vertical direction. Here, the plurality of radical units may be stacked to be aligned at the same position. The apparatus for manufacturing the electrode assembly according to the first embodiment of the present invention comprises a loading box 200, a transfer member 300, a first measuring member 400, and a second measuring member 500.

Loading Box

The loading box 200 is configured to load the plurality of radical units 110 in the vertical direction. A loading space that is opened upward is formed in the loading box 200, and the plurality of radical units 110 are loaded in the loading space.

Transfer Member

The transfer member 300 takes the radical unit 110, which is loaded at the uppermost end, among the radical units 110, which are loaded in the loading box 200, out of the loading box 200 to transfer the radical unit 110 to a first set position H1 and then transfers the radical unit 110, which is disposed at the first set position H1, again to a second set position H2. Here, the transfer member 300 may be a gripper or a conveyor belt.

First Measuring Member

The first measuring member 400 is configured to measure a position of the radical unit 110 at the first set position H1 and comprises a first lighting part 410 and a first measuring part 420.

The first lighting part 410 is provided on a bottom surface of the radical unit 110 that is disposed at the first set position H1 to emit light toward the bottom surface of the radical unit 110. As a result, the second electrode 113 is illuminated onto the separator 112 disposed at the uppermost end by light of the first lighting part 410, and thus, the position of the second electrode 113 disposed between the separators 112 may be checked.

The first measuring part 420 is configured to measure the radical unit transferred to the first set position H1 and is provided above the radical unit 110, which is transferred at the first time (hereinafter, referred to as a radical unit) and disposed at the first set position H1, to photograph an upper portion of the radical unit 110, thereby measuring a distance A1 between an end of the first electrode 111 and an end of the second electrode 113 indicated on the separator 112 from an photographed image.

That is, the first measuring part 420 measures the upper portion of the radical unit 110 disposed at the first set position H1 to measure a distance A1 between the end of the first electrode 111 and the end of the second electrode 113 from the image of the top surface of the radical unit 110. Here, if the measured value (distance) A1 is disposed within the set value, the first measuring part 420 determines that it is normal, and if the measured distance A1 is disposed outside the input set value, the first measuring part 420 determines that is defective. Particularly, if the first measuring part 420 determines that it is defective, the defective radical unit 110 disposed at the first set position H1 is removed so as not to be transferred to the second set position H2.

The first measuring part 420 continuously measures a distance A2 between an end of a first electrode 111 of a second radical unit that is transferred at the second time to the first set position H1 and an end of the second electrode 113 indicated on the separator 112 and a distance An between an end of a first electrode 111 of an n-th radical unit that is transferred at the n-th time to the first set position and an end of the second electrode indicated on the separator 112.

Second Measuring Member

A second measuring member 500 is configured to measure a radical unit 110 transferred to a second set position H2 and comprises a second lighting part 510 and a second measuring part 520.

The second lighting part 510 is provided below the radical unit 110 transferred to the second set position H2 to emit light toward the radical unit 110 transferred to the second set position H2 to illuminate the radical unit 110.

The second measuring part 520 is configured to measure the radical unit 110 transferred to the second set position H2. The second measuring part 520 measures a distance B1 from a reference point O of the second set position H2 to the end of the first electrode 111 of the first radical unit 110, a distance B2 from the reference point O of the second set position H2 to the end of the radical unit, which is transferred at the second time (hereinafter, referred to as a second radical unit) and stacked on the first radical unit, and a distance C1 between an end of the first electrode 111 of the first radical unit 110 and an end of the second electrode 113 of the second radical unit 110 by adding the distances B2 and A2 of the second radical unit 110 to each other and then subtracting the distance B1 of the first radical unit 110 from the sum of the distances B2 and A2. Here, if a difference value between the distance C1 and the distance A1 of the first radical unit is within an input error value, it is determined as normal stacking, and if the difference value is out of the input error value, it is determined as defective stacking.

That is, the second measuring member 500 may measure stacking alignment of the radical units 110, which are sequentially stacked at the second set position H2, through the second lighting part 510 and the second measuring part 520. Particularly, when a stacking error occurs, the position of the second radical unit may be adjusted by the error value to improve the stacking alignment.

Thus, in the apparatus for manufacturing the electrode assembly according to the first embodiment of the present invention, the radical units 110 may be sequentially stacked at the same position to improve the stacking alignment.

Hereinafter, a method for manufacturing the electrode assembly according to the first embodiment of the present invention will be described.

[Method for Manufacturing Electrode Assembly According to First Embodiment of the Present Invention]

As illustrated in FIGS. 3 to 11b, a method for manufacturing the electrode assembly according to the first embodiment of the present invention comprises a step (a) of transferring a radical unit, a step (b) of measuring the radical unit disposed at a first set position, a step (c) of measuring a distance between the second set position and a first radical unit, a step (d) of stacking the first radical unit and the second radical unit, a step (e) of measuring a distance between the second set position and the second radical unit, a step (f) of measuring a distance between the first radical unit and the second radical unit, and a step (g) of determining whether stacking is defective by comparing the measured value of the first radical unit to the measured value of the second radical unit.

Hereinafter, the method of manufacturing the electrode assembly according to the first embodiment of the present invention will be described in detail with reference to the accompanying drawings. A reference symbol x shown in FIG. 1 represents a full width direction of the radical unit, and a reference symbol y represents a full length direction of the radical unit.

Step (a)

In the step (a), referring to FIG. 2, a plurality of radical units 110 loaded in a loading box 200 are transferred one by one using a transfer member 300 from a first set position H1 to a second set position H2. For example, in the step (a), the first radical unit 110 loaded at the uppermost end among the plurality of radical units 110 loaded in the loading box 200 is transferred up to the first set position H1, and the radical unit 110 disposed at the first set position H1 after a set time elapses is transferred up to the second set position H2. Next, the second radical unit 110 loaded at the uppermost end among the plurality of radical units 110 is transferred up to the first set position H1, and the second radical unit 110 disposed at the first set position H1 after the set time elapses is transferred up to the second set position H2. Next, an n-th radical unit 110 loaded at the uppermost end among the plurality of radical units 110 is transferred up to the first position H1, and the n-th radical unit 110 disposed at the first set position H1 after the set time elapses is transferred up to the second set position H2. In the step (a), all the radical units 110 loaded in the loading box 200 are transferred in the above-described manner.

Here, in step (a), when the first radical unit 110 is disposed at the second set position H2, the second radical unit 110 is stacked on the first radical unit 110. That is, the first radical unit 110 to the n-th radical unit 110 are sequentially stacked in the above-described manner. Thus, the first radical unit, the second radical unit, and n-th radical unit are sequentially stacked upward at the second set position H2 to manufacture the electrode assembly.

The radical unit 100 has a four-layered structure in which a first electrode 111, a separator 112, a second electrode 113, and a separator 112 are sequentially stacked.

Hereinafter, for clarity of explanation, the first radical unit drawn out from the loading box 200 is referred to as the first radical unit and is represented by reference numeral 110A. Also, the second radical unit drawn out from the loading box 200 and stacked on the first radical unit 100A is referred to as the second radical unit and is represented by reference numeral 110B. Also, the n-th radical unit drawn out from the loading box 200 and stacked on the second radical unit 110B is referred to as the n-th radical unit and is represented by reference numeral 110N.

A placement plate for arranging the radical unit is provided at each of the first set position H1 and the second set position H2, and thus, the radical unit may be stably disposed through the placement plate.

Thus, in the step (a), the first radical unit 110A of the plurality of radical unit loaded in the loading box 200 is transferred from the first set position H1 to the second set position H2.

Step (b)

Figure 4A:
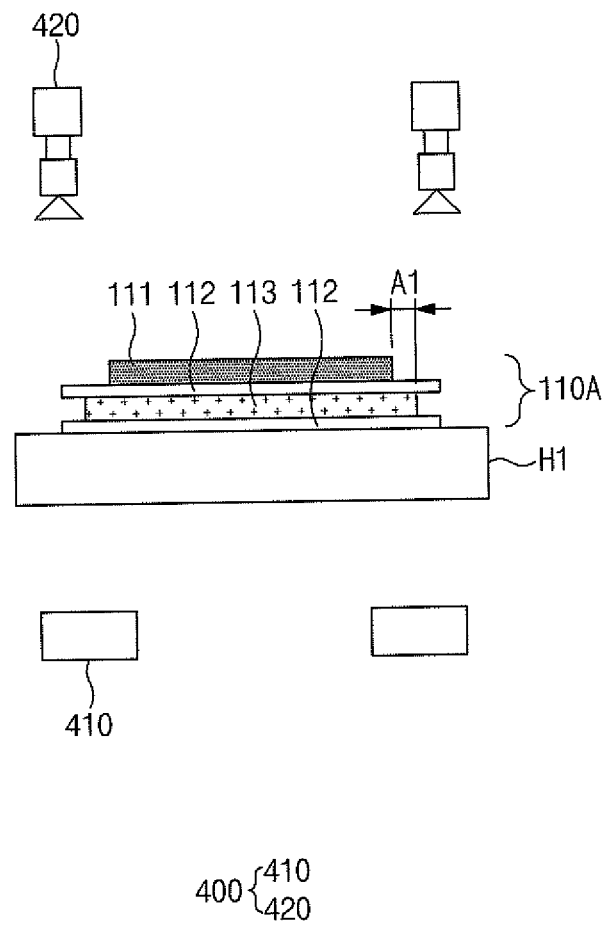
FIGS. 4a and 4b are side views illustrating a step (b) of the method for manufacturing the electrode assembly according to the first embodiment of the present invention.

The step (b) comprises a process of measuring a distance A. As illustrated in FIG. 4a, in the process of measuring the distance A, the radical unit transferred to the first set position H1, i.e., the first radical unit 100A is photographed to measure a distance A1 between a full width end that is an end (a right end of the first electrode when viewed in FIG. 4a) in the full width direction x of the first electrode 111 provided in the first radical unit 100A and a full width end that is an end (a right end of the second electrode when viewed in FIG. 4a) in the full width direction x of the second electrode 113 through the photographed image.

That is, the distance A1 denotes a distance from the full width end of the first electrode 111 to the full width end of the second electrode 113, which are provided in the first radical unit.

Here, the first electrode 111 has an area less than that of the second electrode 113, and thus, the position of the second electrode 113 disposed between the separators 112 may be effectively photographed using fluoroscopy.

Here, the step (b) further comprises a process of determining that it is normal if the measured distance A1 is within the set value and determining that is defective if the measured distance A1 is out of the set value. That is, the step (b) further comprises a process of inspecting whether the radical unit is defective. In this process, a stacking error between the first electrode 111 and the second electrode 113, which are vertically stacked, may be detected to inspect whether it is defective.

More specifically, in step (b), if the measured distance A1 is within the input set value, it is determined as normal stacking in which a reference point of the first electrode 111 and a reference point of the second electrode 113 are stacked on the same vertical line, and if the measured distance A1 is out of the input set value, it is determined as defective stacking because the reference point of the first electrode 111 and the reference point of the second electrode 113 are not stacked on the same vertical line.

The step (b) further comprises a process of removing the first radical unit 110A so that the first radical unit 110A is not transferred to the second set position H2 if it is determined that the first radical unit 110A is defective at the first set position H1. That is, in the step (b), the first radical unit 110A that is determined as being defective is removed so as not to manufacture the electrode assembly by using the defective radical unit.

The first measuring member 400 measures the distance A1 between a full width end of the first electrode 111 and a full width end of the second electrode of the first radical unit 100A transferred to the first set position H1 by using a vision alignment tester. Here, the vision alignment tester photographs an image of a product by using a camera to detect quantity, omission, location, shape, dimension, barcode, outer appearance, etc. of the product. Here, the vision alignment tester may detect all precise detects that are difficult to be detected through the human eye.

The input set value may be 1.0 mm or less. That is, when the distance A1 is 1.0 mm or more, there is a possibility that a short circuit occurs due to the defective stacking of the first electrode 111 and the second electrode 113. Thus, in step (b), only the radical unit having a distance A1 of 1.0 mm or less is transferred to the second set position H2 to prevent a defective electrode assembly from being manufactured.

In the process of measuring the distance A, a distance A2 between a full width end of a first electrode 111 of a second radical unit that is transferred at the second time to the first set position H1 and a full width end of the second electrode 113 indicated on the separator 112 and a distance An between a full width end of a first electrode 111 of an n-th radical unit that is transferred at the n-th time to the first set position and a full width end of the second electrode indicated on the separator 112 are continuously measured.

Figure 4B:
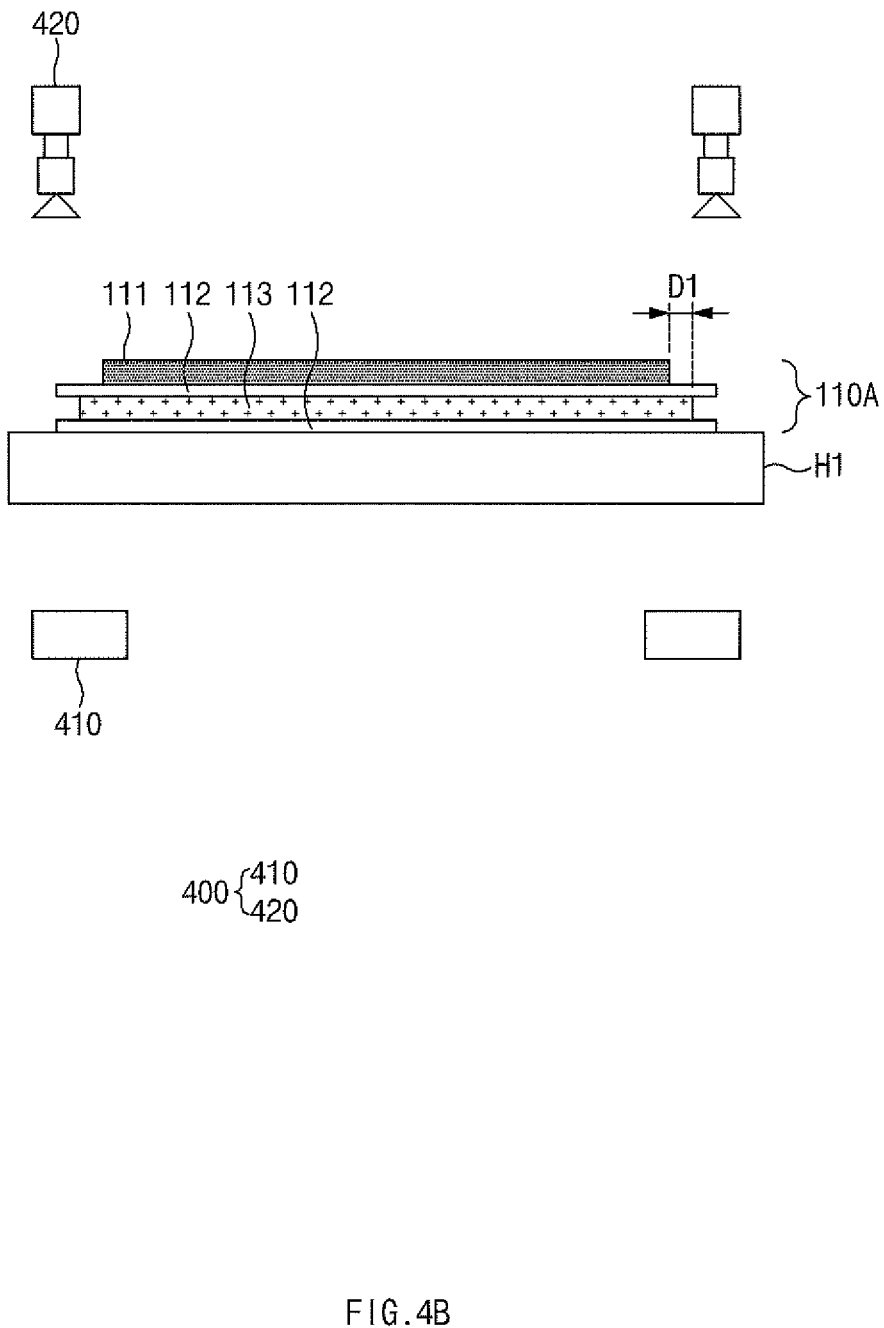

The step (b) further comprises a process of measuring a distance D. As illustrated in FIG. 4b, in the process of measuring the distance D, the distance D between a full length end that is an end of the first electrode 111 in a full length direction y and a full length end that is an end of the second electrode 113 in the full length direction y is measured using the image photographed by the first measuring member 400.

That is, the distance D1 denotes a distance from the full length end of the first electrode 111 to the full length end of the second electrode 113.

Thus, the step (b) comprises a process of determining that it is normal if the measured distance values A1 and D1 are within an input set value and determining that it is defective if the measured distance values A1 and D1 are out of the input set value. Due to this characteristic, whether the radical unit is defective may be previously checked to prevent the defective electrode assembly from being manufactured.

Also, the step (b) further comprises a process of removing the radical unit so as not to be transferred to the second set position if it is determined that the radical unit is defective at the first set position. Due to this characteristic, it is possible to prevent the defective radical unit from being stacked.

In the process of measuring the distance D, a distance D2 between a full length end of a first electrode 111 of the second radical unit that is transferred at the second time to the first set position H1 and a full length end of the second electrode 113 indicated on the separator 112 and a distance Dn between a full length end of a first electrode 111 of the n-th radical unit that is transferred at the n-th time to the first set position and a full length end of the second electrode indicated on the separator 112 are continuously measured.

Step (c)

Figure 5:
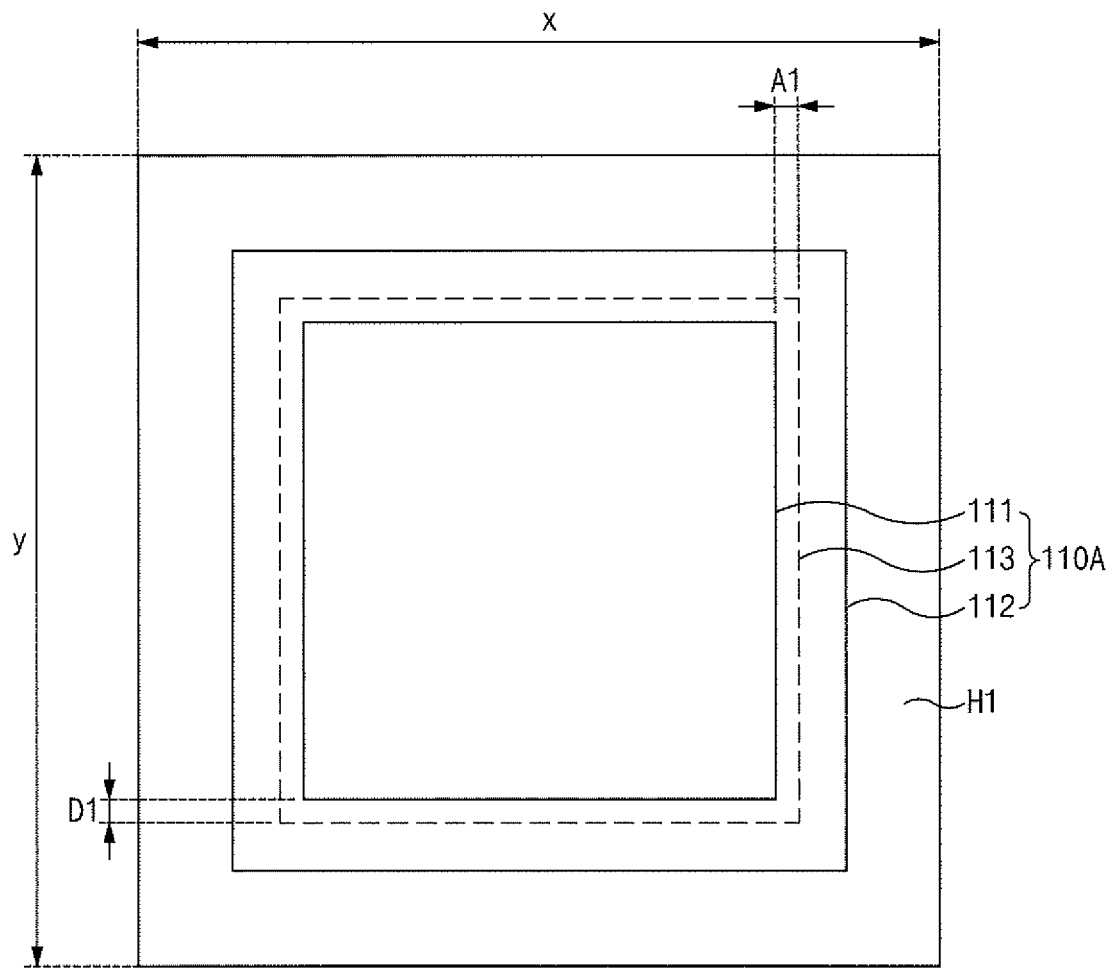
Figure 6A:
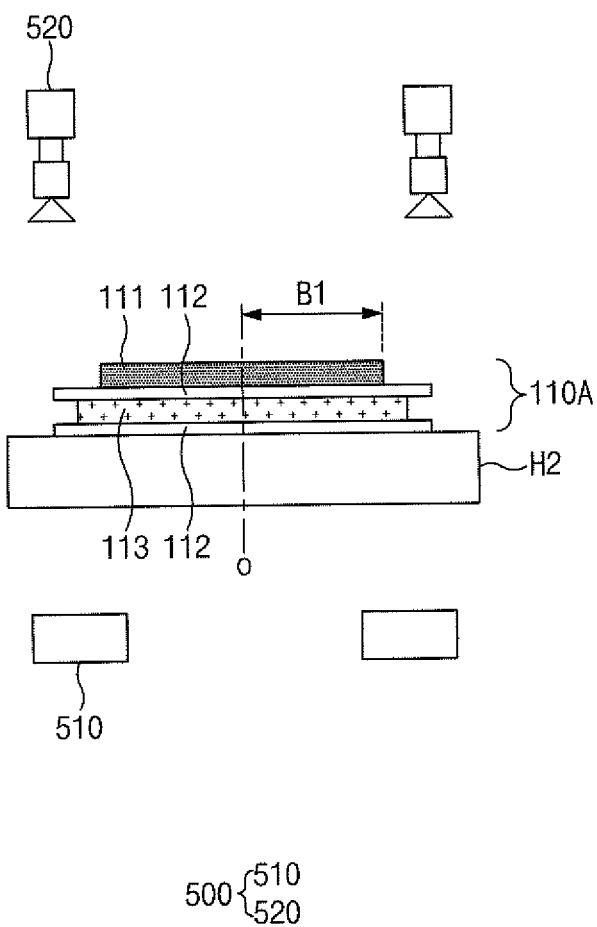
FIGS. 6a and 6b are side views illustrating a step (c) of the method for manufacturing the electrode assembly according to the first embodiment of the present invention.

The step (c) comprises a process of measuring a distance B1. As illustrated in FIGS. 5 and 6a, in the process of measuring the distance B1, when the radical unit, at which the distance A1 is measured, is transferred to the second set position H2, the distance B1 from the reference point O of the second set position H2 to the full width end of the first electrode 111 of the first radical unit 110A is measured using the second measuring member 500.

Figure 7:
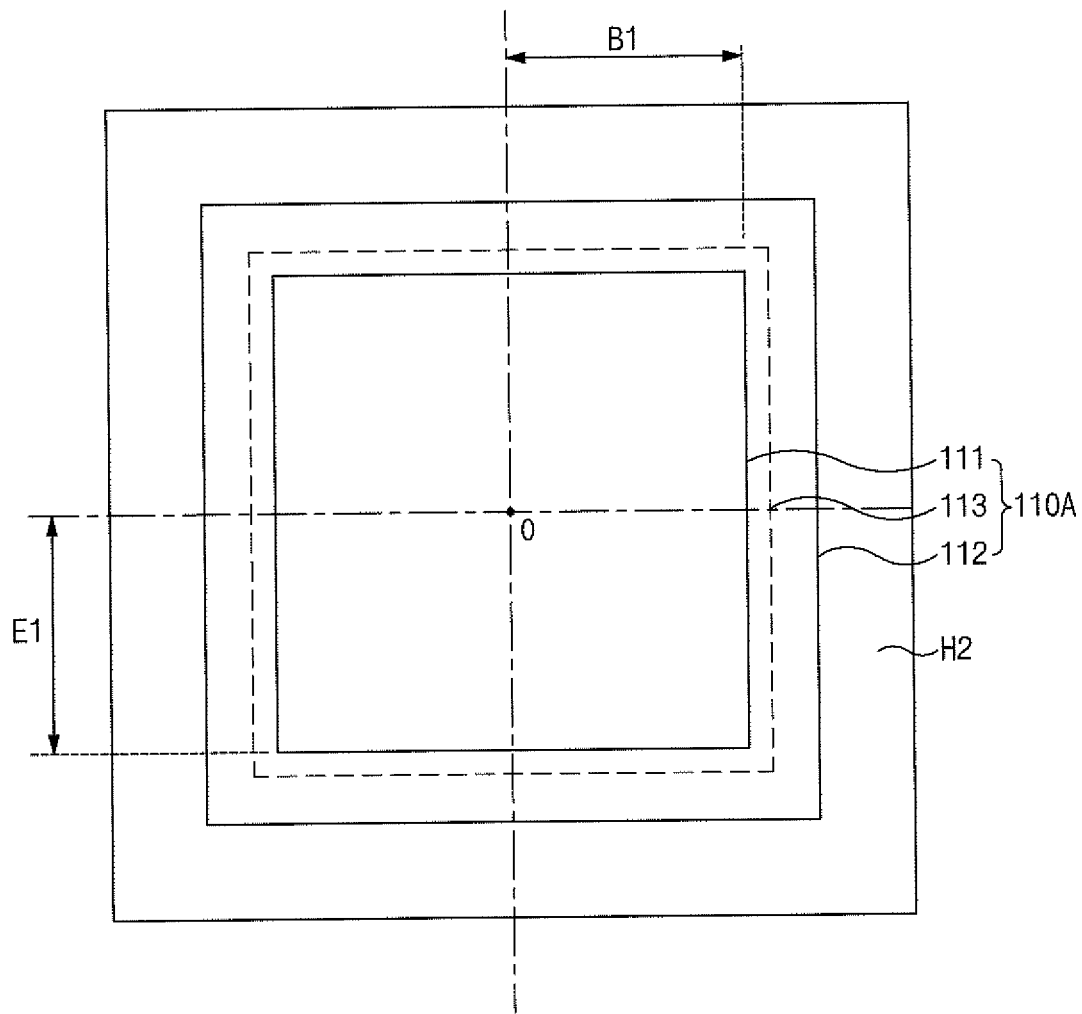
Figure 8:
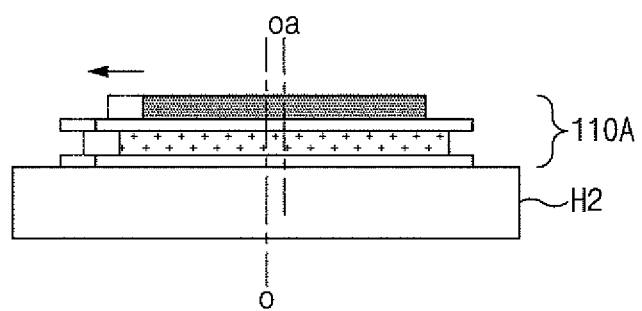
FIG. 8 is a side view illustrating a process of correcting a position in the step (c) of the method for manufacturing the electrode assembly according to the first embodiment of the present invention.

Here, as illustrated in FIGS. 7 and 8, the step (c) further comprises a process of inspecting whether the reference point O of the second set position H2 and the reference point of the first radical unit 110A match with each other. That is, in the step (c), if the reference point O of the second set position H2 and the reference point Oa of the first radical unit 110A match with each other, it is determined as being normal, and when the reference point O of the second set position H2 and the reference point Oa of the first radical unit 110A mismatch with each other, it is determined as being defective. Particularly, when the reference point O of the second set position H2 and the reference point Oa of the first radical unit 110A mismatch with each other, the first radical unit 110A is moved by an error value between the reference point O of the second set position H2 and the reference point Oa of the first radical unit 110A by using the transfer member 300 so that the reference point O of the second set position H2 and the reference point Oa of the first radical unit 110A match with each other.

The reference point Oa of the first radical unit 110A may be a point at which a line equally dividing the first radical unit 110A in the full width direction x and a line equally dividing the first radical unit 110A in the full length direction y cross each other. Thus, the measured distance value of the radical unit transferred to the second set position H2 may be uniformly measured. Of course, the reference lines of the first and second electrodes 111 and 113 may be lines equally dividing the first and second electrodes 111 and 113 in the width direction, respectively.

Figure 6B:
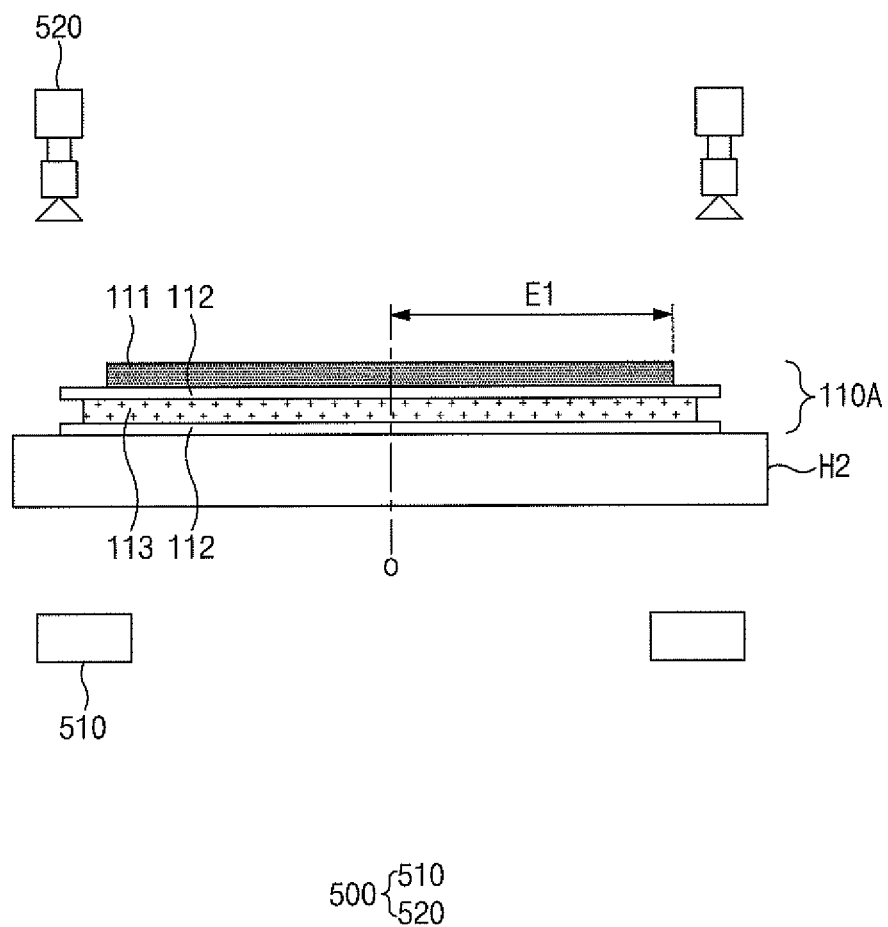

The step (c) comprises a process of measuring a distance E1. As illustrated in FIGS. 5 and 6*b*, in the process of measuring the distance E1, when the radical unit, at which the distance D1 is measured, is transferred to the second set position H2, the distance E1 from the reference point O of the second set position H2 to the full length end of the first electrode 111 of the first radical unit 110A is measured using the second measuring member 500.

Step (d)

Figure 9:
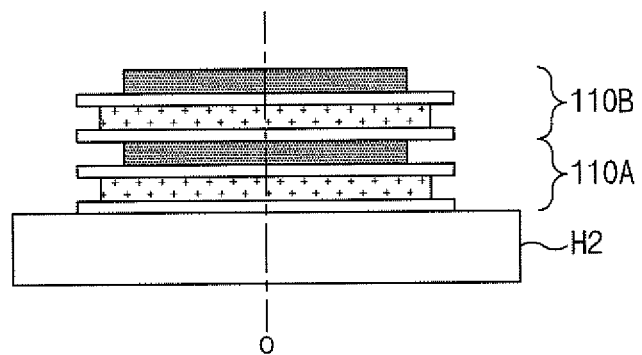
FIG. 9 is a side view illustrating a step (d) of the method for manufacturing the electrode assembly according to the first embodiment of the present invention.

In the step (d), as illustrated in FIG. 9, the second radical unit 110B transferred to the second set position H2 via the first set position H1 is stacked on the first radical unit 110A, at which the distance B1 is measured. Thus, a stack in which the second radical unit 110B and the first radical unit 110A are vertically disposed may be manufactured at the second set position H2.

Here, in the second radical unit 110B, a distance A2 between a full width end (a right end of the first electrode when viewed in FIG. 10*a*) of the first electrode 111 and a full width end (a right end of the second electrode when viewed in FIG. 10*a*) of the second electrode 113, which are provided in the second radical unit 110B, is measured at the first set position H1.

Also, in the second radical unit 110B, a distance D2 between a full length end of the first electrode 111 and a full length end of the second electrode 113 is measured at the first set position H1.

Step (e)

Figure 10A:
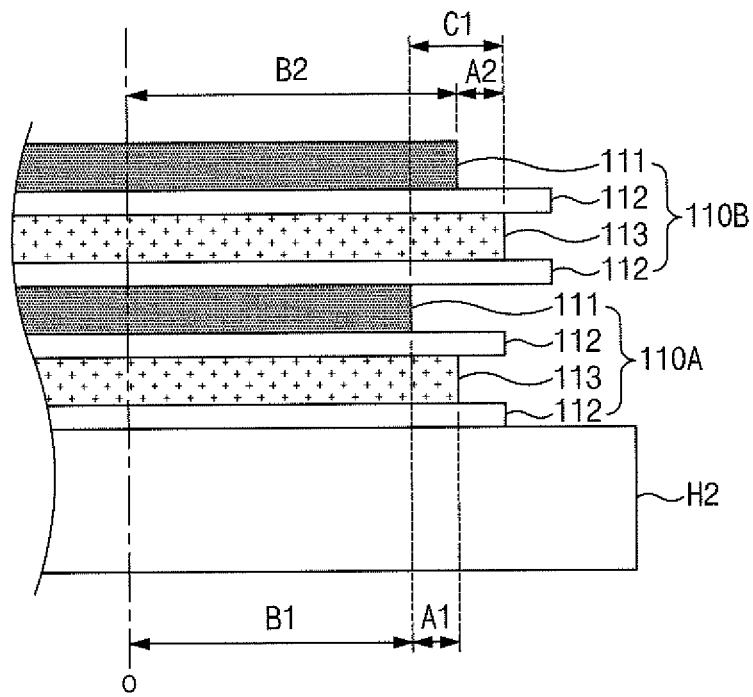
FIGS. 10a and 10b are side views illustrating steps (e), (f), and (g) of the method for manufacturing the electrode assembly according to the first embodiment of the present invention.

The step (e) comprises a process of measuring a distance B2. As illustrated in FIG. 10*a*, in the process of measuring the distance B2, the distance B2 from the reference point O of the second set position H2 to the full width end of the first electrode 111 of the second radical unit 110B is measured.

Figure 10B:
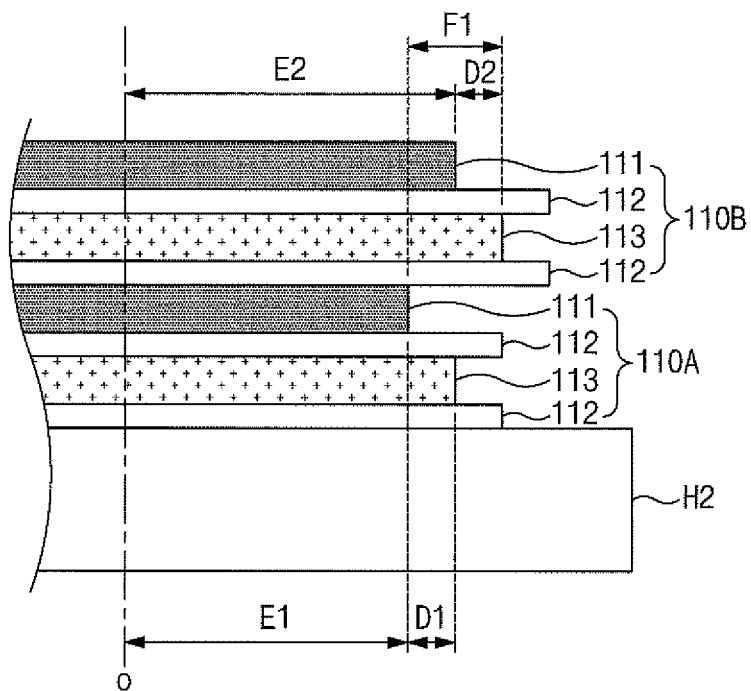

The step (e) comprises a process of measuring a distance E2. As illustrated in FIG. 10*b*, in the process of measuring the distance E2, the distance E2 from the reference point O of the second set position H2 to the full length end of the first electrode 111 of the second radical unit 110B is measured.

Step (f)

The step (f) comprises a process of measuring a distance C1. In the process of measuring the distance C1, the distance C1 between the full width end of the first electrode 111 of the first radical unit 110A and the full width end of the second electrode 113 of the second radical unit 110B is measured by adding the distances B2 and A2 of the second radical unit 110B to each other and then subtracting the distance B1 of the first radical unit 110A from the sum of the distances B2 and A2.

That is, a calculation formula expressed as B2+A2−B1=C1 may be obtained.

The step (f) comprises a process of measuring a distance F1. In the process of measuring the distance F1, the distance F1 between the full length end of the first electrode 111 of the first radical unit 110A and the full length end of the second electrode 113 of the second radical unit 110B is measured by adding the distances E2 and D2 of the second radical unit 110B to each other and then subtracting the distance E1 of the first radical unit 110A from the sum of the distances E2 and D2.

That is, a calculation formula expressed as E2+D2−E1=F1 may be obtained.

Step (g)

The step (g) comprises a full width inspection process of inspecting an alignment of the first radical unit and the second radical unit in the full width direction x. In the full width inspection process, the distance C1 and the distance A1 of the first radical unit 110A are compared to each other, and then, if a difference value between the distances C1 and A1 is within the input error value, it is determined as normal stacking, and if the difference value is out of the input error value, it is determined as defective stacking. Here, the error value may range of 0.1 mm to 2 mm.

That is, in the full width inspection process of the step (g), if the difference value between the distance C1 and the distance A1 of the radical unit 110A is within the error value, since the full width end of the first electrode 110A and the full width end of the second electrode 113 of the second radical unit 110B are disposed at the same vertical line, it is determined as normal stacking. Also, if the difference value between the distance C1 and the distance A1 of the radical unit 110A is out of the error value, since the full width end of the first electrode 110A and the full width end of the second electrode 113 of the second radical unit 110B are significantly spaced apart from each other, it is determined as defective stacking.

The full width inspection process of the step (g) comprises a process of adjusting the position of the second radical unit 110B by the error value between the distance C1 and the distance A1 of the first radical unit 110A if the distance C1 and the distance A1 of the first radical unit 110A are different from each other. Thus, stacking alignment of the first radical unit 110A and the second radical unit 110B in the full width direction may be improved.

The step (g) comprises a full length inspection process of inspecting an alignment of the first radical unit and the second radical unit in the full length direction y. In the full length inspection process, the distance F1 and the distance D1 of the first radical unit 110A are compared to each other, and then, if a difference value between the distances F1 and D1 is within the input error value, it is determined as normal stacking, and if the difference value is out of the input error value, it is determined as defective stacking.

That is, in the full length inspection process of the step (g), if the difference value between the distance F1 and the distance D1 of the radical unit 110A is within the error value, since the full length end of the first electrode 110A and the full length end of the second electrode 113 of the second radical unit 110B are disposed at the same vertical line, it is determined as normal stacking. Also, if the difference value between the distance F1 and the distance D1 of the radical unit 110A is out of the error value, since the full length end of the first electrode 110A and the full length end of the second electrode 113 of the second radical unit 110B are significantly spaced apart from each other, it is determined as defective stacking.

The full length inspection process of the step (g) comprises a process of adjusting the position of the second radical unit 110B by the error value between the distance F1 and the distance D1 if the distance F1 and the distance D1 of the first radical unit 110A are different from each other. Thus, stacking alignment of the first radical unit 110A and the second radical unit 110B in the full length direction y may be improved.

If it is determined as the normal stacking in the full width inspection process and the full length inspection process, the step (g) further comprises a process of bonding the first radical unit 110A to the second radical unit 110B to prevent meandering defects from occurring.

Here, bonding force between the first radical unit 110A and the second radical unit 110B may be less than that between an electrode and a separator, which are provided in each of the first radical unit 110A and the second radical unit 110B. Thus, even though the first radical unit 110A and the second radical unit 110B are separated from each other as necessary, the electrode and the separator, which are provided in each of the first radical unit 110A and the second radical unit 110B, may be prevented from being separated from each other.

After the step (g), step (h), step (i), step (j) and step (k) may be further performed.

Step (h)

In step (h), after step (g), an n-th radical unit 110N transferred to the second set position H2 via the first set position H1 is stacked on the second radical unit 110B.

Here, in the n-th radical unit 110N, a distance An between a full width end (a right end of the first electrode when viewed in FIG. 11a) of a first electrode 111 and a full width end (a right end of the second electrode when viewed in FIG. 11a) of a second electrode 113, which are provided in the n-th radical unit 110N, is measured at the first set position H1.

Also, in the step (h), a distance Dn between a full length end (a right end of the first electrode when viewed in FIG. 11b) of the first electrode 111 and a full length end (a right end of the second electrode when viewed in FIG. 11b) of the second electrode 113, which are provided in the n-th radical unit 110N, is measured at the first set position H1.

Step (i)

Figure 11A:
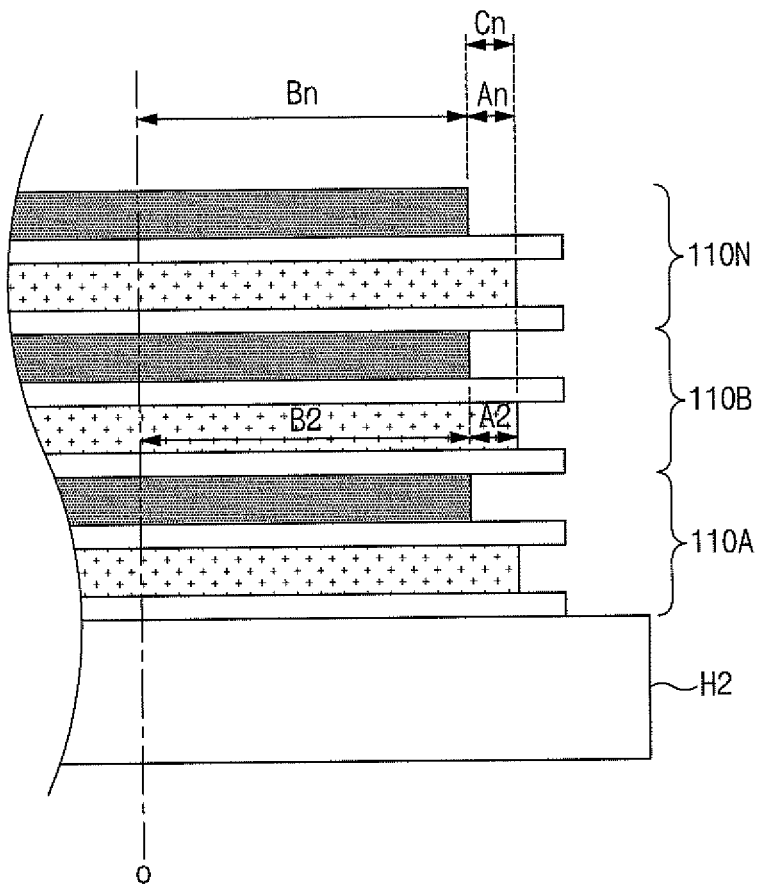
FIGS. 11a and 11b are side views illustrating a steps (h), (i), (j), and (k) of the method for manufacturing the electrode assembly according to the first embodiment of the present invention.

The step (i) comprises a process of measuring a distance Bn. As illustrated in FIG. 11a, in the process of measuring the distance Bn, the distance Bn from the reference point O of the second set position H2 to an end of the first electrode 111 of the n-th radical unit 110N is measured.

Figure 11B:
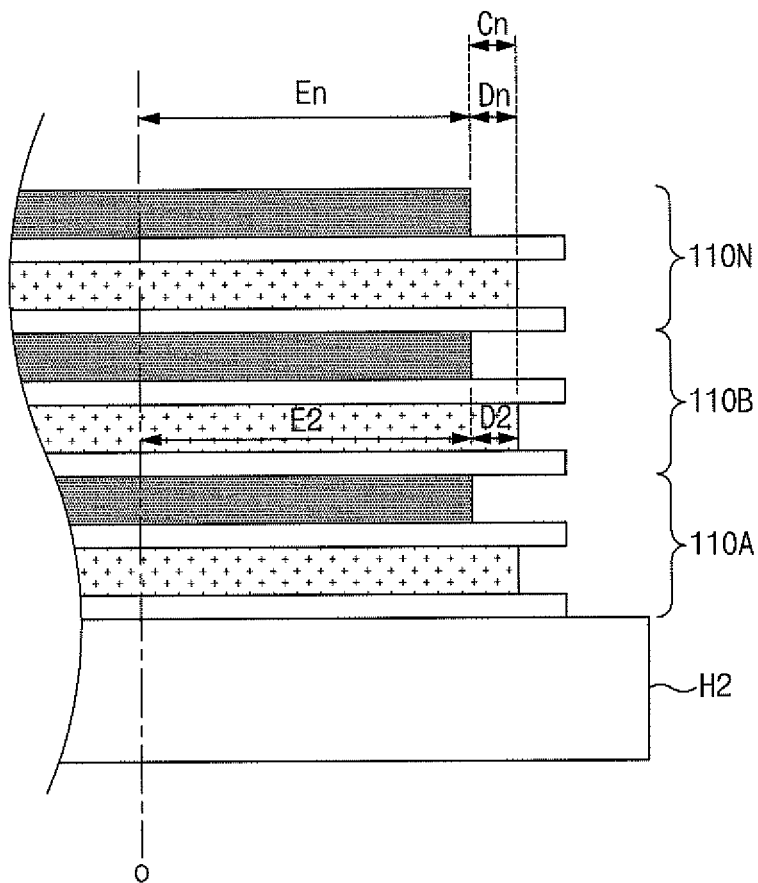

Also, the step (i) comprises a process of measuring a distance En. As illustrated in FIG. 11b, in the process of measuring the distance En, the distance En from the reference point O of the second set position H2 to the end of the first electrode 111 of the n-th radical unit 110N is measured.

Step (j)

The step (j) comprises a process of measuring a distance Cn. In the process of measuring the distance Cn, the distance Cn between the full width end of the first electrode 111 of the second radical unit 110B and the full width end of the second electrode 113 of the N-th radical unit 110N is measured by adding the distances Bn and An of the n-th radical unit 110N to each other and then subtracting the distance B2 of the second radical unit 110B from the sum of the distances Bn and An.

That is, a calculation formula expressed as Bn+An−B2=Cn may be obtained.

Also, the step (j) comprises a process of measuring a distance Fn. In the process of measuring the distance Fn, the distance Fn between the full length end of the first electrode 111 of the second radical unit 110B and the full length end of the second electrode 113 of the N-th radical unit 110N is measured by adding the distances En and Dn of the n-th radical unit 110N to each other and then subtracting the distance E2 of the second radical unit 110B from the sum of the distances En and Dn.

That is, a calculation formula expressed as En+Dn−E2=Fn may be obtained.

Step (k)

The step (k) comprises a full width inspection process of inspecting an alignment of the second radical unit and the n-th radical unit in the full width direction. In the full width inspection process, the distance Cn and the distance A2 of the second radical unit 110B are compared to each other, and then, if a difference value between the distances Cn and A2 is within the input error value, it is determined as normal stacking, and if the difference value is out of the input error value, it is determined as defective stacking. Meanwhile, criteria for determining the normal or defective stacking are the same as in step (g) described above.

Also, the step (k) comprises a full length inspection process of inspecting an alignment of the second radical unit and the n-th radical unit in the full length direction. In the full length inspection process, the distance Fn and the distance D2 of the second radical unit 110B are compared to each other, and then, if a difference value between the distances Fn and D2 is within the input error value, it is determined as normal stacking, and if the difference value is out of the input error value, it is determined as defective stacking. Meanwhile, criteria for determining the normal or defective stacking are the same as in step (g) described above.

Therefore, in the method for manufacturing the electrode assembly according to the first embodiment of the present invention, the plurality of radical units 110 may be vertically stacked to manufacture the electrode assembly 100 having the improved stacking alignment as described above.

Hereinafter, in descriptions of another embodiment of the present invention, constituent and method having the same function and method as the foregoing embodiment have been given the same reference numeral in the drawings, and thus duplicated description will be omitted.

[Method for Manufacturing Secondary Battery According to Second Embodiment of the Present Invention]

Figure 12:
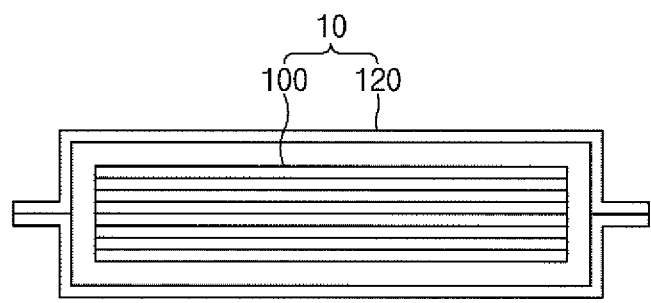
FIG. 12 is a cross-sectional view of a secondary battery according to a second embodiment of the present invention.

As illustrated in FIG. 12, a method for manufacturing a secondary battery according to a second embodiment of the present invention comprises a step (A) of manufacturing an electrode assembly 100 and a step (B) of accommodating the electrode assembly 100 in a battery case 120 and injecting an electrolyte into the battery case 120 to manufacture a secondary battery 10.

Here, the step (A) is the same as the method of manufacturing the electrode assembly according to the first embodiment described above, and accordingly, a duplicate description will be omitted.

Therefore, in the method for manufacturing the secondary battery according to the second embodiment of the present invention, the secondary battery 10 comprising the electrode assembly 100 having the improved alignment may be manufactured to significantly reduce an occurrence of defects and improve commercial values.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Electrode assembly
110: Radical unit
120: Battery case

The invention claimed is:

1. A method for manufacturing an electrode assembly, the method comprising:
   a step (a) of transferring a plurality of radical units, in which a first electrode, a separator, a second electrode, and a separator are sequentially stacked, one by one from a first set position to a second set position;
   a step (b) comprising a process of photographing and measuring the radical units at the first set position to measure a distance A1 of a first radical unit of the plurality of radical units between a full width end that is an end of the respective first electrode in a full width direction and a full width end that is an end of the respective second electrode in the full width direction, a distance A2 of a second radical unit of the plurality of radical units between a full width end that is an end of the respective first electrode in the full width direction and a full width end that is an end of the respective second electrode in the full width direction, and a distance An of an n-th radical unit of the plurality of radical units between a full width end that is an end of the respective first electrode in the full width direction and a full width end that is an end of the respective second electrode in the full width direction;
   a step (c) comprising a process of measuring a distance B1 of the first radical unit when the first radical unit is transferred to the second set position, the distance B1 being measured from a reference point O of the second set position to the full width end of the first electrode of the first radical unit;
   a step (d) of transferring the second radical unit from the first set position to the second set position and stacking the second radical unit on the first radical unit;
   a step (e) comprising a process of measuring a distance B2 of the second radical unit from the reference point O of the second set position to the full width end of the first electrode of the second radical unit;
   a step (f) comprising a process of measuring a distance C1 between the full width end of the first electrode of the first radical unit and the full width end of the second electrode of the second radical unit by adding the distances B2, A2 to each other and subtracting the distance B1 from the sum of the distances B2, A2; and
   a step (g) comprising a full width inspection process, in which the distances C1, A1 are compared to each other to determine that the stacking is normal when a difference value between the distances C1, A1 is less than or equal to an input error value, and the stacking is defective when the difference value is greater than the input error value.

2. The method of claim 1, wherein the step (b) further comprises a process of determining that when the distance A1 is less than or equal to an input set value, the stacking is normal, and when the distance A1 is greater than the input set value, the stacking is defective.

3. The method of claim 2, wherein the step (b) further comprises a process of removing a defective radical unit of the plurality of radical units so as not to be transferred to the second set position when it is determined that the stacking of the defective radical unit is defective at the first set position.

4. The method of claim 1, wherein, during the step (b), the distances A1, A2, and An are measured at the first set position using a vision alignment tester.

5. The method of claim 1, wherein the step (c) further comprises a process of inspecting whether the reference point O of the second set position and a reference point of the first radical unit match with each other,
   wherein the reference point of the first radical unit is a point at which a line equally dividing the first radical unit in the full width direction and a line equally dividing the first radical unit in a full length direction cross each other.

6. The method of claim 5, wherein the step (c) further comprises a process in which, when the reference point O of the second set position and a reference point of one of the plurality of radical units mismatch with each other, the one of the plurality of radical units is moved so that the reference point O of the second set position and the reference point of the one of the plurality of radical units match with each other.

7. The method of claim 1, wherein the step (g) further comprises a process in which, when it is determined that the stacking of the second radical unit is defective, a position of the second radical unit is adjusted by a difference value obtained by comparing the distance C1 to the distance A1 of the first radical unit.

8. The method of claim 1, wherein, during the step (a), the first electrode has an area less than that of the second electrode of each of the radical units.

9. The method of claim 1, wherein the step (g) further comprises a process in which, when it is determined that the stacking of the second radical unit is normal, the first radical unit and the second radical unit are bonded to each other.

10. The method of claim 1, further comprising:
    a step (h) of, after the step (g), transferring the n-th radical unit from the first set position to the second set position and stacking the n-th radical unit on the second radical unit;
    a step (i) comprising a process of measuring a full width distance Bn of the n-th radical unit from the reference point O of the second set position to the full width end of the first electrode of the n-th radical unit;
    a step (j) comprising a process of measuring a distance Cn between the full width end of the first electrode of the second radical unit and the full width end of the second electrode of the n-th radical unit by adding the distances Bn, An to each other and subtracting the distance B2 from the sum of the distances Bn, An; and
    a step (k) of comparing the distance Cn to the distance A2 of the second radical unit to determine that the stacking is normal when a difference value between the distances Cn, A2 is less than or equal to the input error value, and the stacking is defective when the difference value is greater than the input error value.

11. The method of claim 10, wherein the step (b) further comprises a process of photographing and measuring a distance D1 of the first radical unit between a full length end that is an end of the respective first electrode in a full length direction and a full length end that is an end of the respective second electrode in the full length direction, a distance D2 of the second radical unit between a full length end that is an end of the respective first electrode in the full length direction and a full length end that is an end of the respective second electrode in the full length direction, and a distance Dn of the n-th radical unit between a full length end that is an end of the respective first electrode in the full length direction and a full length end that is an end of the respective second electrode in the full length direction,
    the step (c) further comprises a process of measuring a distance E1 from the reference point O of the second set position to the full length end of the first electrode of the first radical unit, the step (e) further comprises a process of measuring a distance E2 from the reference point O of the second set position to the full length end of the first electrode of the second radical unit, the step (f) further comprises a process of measuring a distance F1 between the full length end of the first electrode of the first radical unit and the full length end of the second electrode of the second radical unit by adding the distances E2, D2 of the second radical units to each other and subtracting the distance E1 from the sum of the distances E2, D2, and the step (g) further comprises a full width inspection process, in which the distance F1 and the distance D1 of the first radical unit are compared to each other to determine that the stacking is normal when a difference value between the distances F1, D1 is less than or equal to an input error value, and the stacking is defective when the difference value is greater than or equal to the input error value.

12. The method of claim 11, wherein the step (g) further comprises a process in which, when it is determined that the stacking of the second radical unit is defective, a position of the second radical unit is adjusted by a difference value obtained by comparing the distance F1 and the distance D1 of the first radical unit.

13. The method of claim 11, wherein the step (i) further comprises a process of measuring a distance En of the n-th radical unit from the reference point O of the second set position to the full length end of the first electrode of the n-th radical unit, the step (j) further comprises a process of measuring a distance Fn of the n-th radical unit between the full length end of the first electrode of the second radical unit and the full length end of the second electrode of the n-th radical unit by adding the distances En, Dn of the n-th radical unit to each other and subtracting the distance D2 from the sum of the distances En, Dn, and the step (k) further comprises a process of comparing the distance Fn to the distance D2 of the second radical unit to determine that the stacking is normal when a difference value between the distances Fn, D2 is less than or equal to the respective input error value, and the stacking is defective when the difference value is greater than the respective input error value.

14. A method for manufacturing a secondary battery, the method comprising:
   a step (A) of manufacturing an electrode assembly by performing the method according to claim 1; and
   a step (B) of accommodating the electrode assembly in a battery case and injecting an electrolyte into the battery case.

* * * * *